Figure 1:
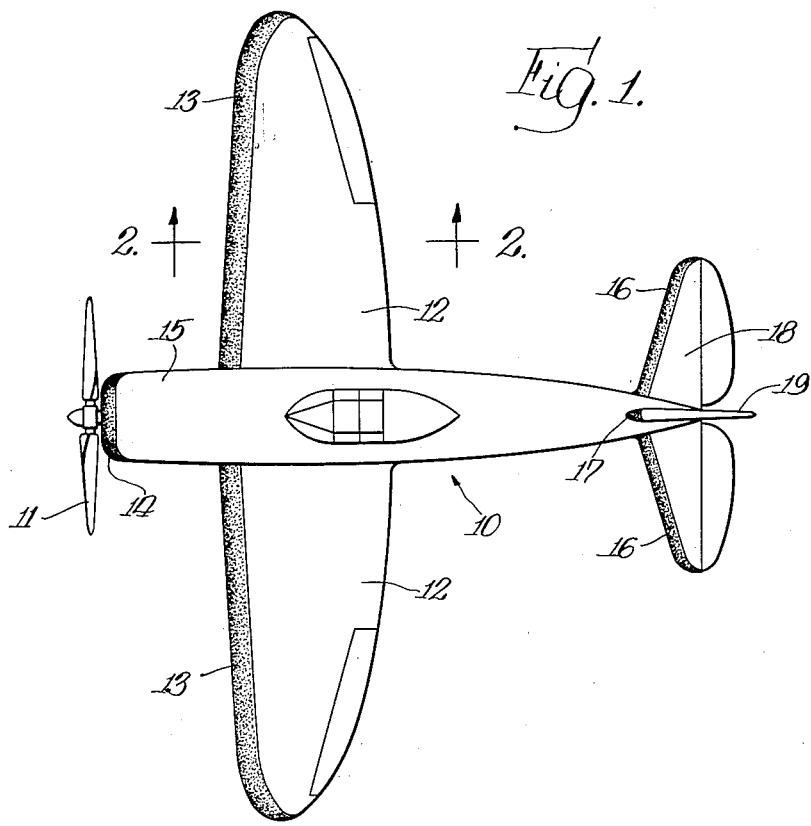

Nov. 4, 1952     R. H. GEORGE     2,616,638

STATIC ELIMINATION FROM AIRCRAFT

Filed Nov. 27, 1944

INVENTOR.
Roscoe H. George,
BY
*Brown Jackson Boettcher Dienner*
Atty's.

Patented Nov. 4, 1952

2,616,638

UNITED STATES PATENT OFFICE 2,616,638

STATIC ELIMINATION FROM AIRCRAFT

Roscoe H. George, West Lafayette, Ind., assignor to Purdue Research Foundation, La Fayette, Ind., a corporation of Indiana Application November 27, 1944, Serial No. 565,343

5 Claims. (Cl. 244—1)

My invention relates generally to means for eliminating interference with radio reception in a vehicle, such as an aircraft flying through certain atmospheric conditions, and particularly to neutralizing the static charge acquired thereby, which, if not neutralized would, particularly on discharge, interfere with radio reception in the aircraft.

In my Patent No. 2,309,584 I have pointed out in detail how the discharge of static charges acquired by aircraft, particularly an "all metal" aircraft flying through certain atmospheric conditions, such as snow or ice crystals, rain, hail and dust, causes interference with radio receptions in the aircraft. I have there disclosed means for eliminating the interference thus caused by dissipating these static charges.

According to the present invention, I have provided a method and means for neutralizing static by producing through atmospheric engagement a counter or discharging effect in one part which opposes the charging effect in another part. Thus instead of permitting the static charges to collect and build up an undesired potential which must be dissipated, I provide for neutralizing them. As a result, there is substantially no undesired static potential generated that is required to be dissipated, and consequently there is no resultant interference with radio reception.

Accordingly, an object of my invention is to provide for neutralizing or limiting the static charge tending to be acquired by a body moving through certain atmospheric conditions, by provision of means providing at least a shielding effect upon the chief surfaces where the development of a static charge would occur, and preferably creating a counter or discharging potential acquired from the same atmospheric conditions.

Another object of my invention is to move conjointly with the surface of the body which acquires a static charge of one polarity another material which, in the same atmospheric conditions, acquires a static charge of opposite polarity.

A further object of my invention is to coat the leading surfaces of an aircraft of the all metal type disposed to acquire a negative static charge while flying through snow or ice crystals or the like, with a material such as lead, which under the same conditions acquires a positive static charge that correspondingly neutralizes the negative charge.

Other objects of my invention will, in part, be obvious, and, in part, appear hereinafter.

Figure 2:
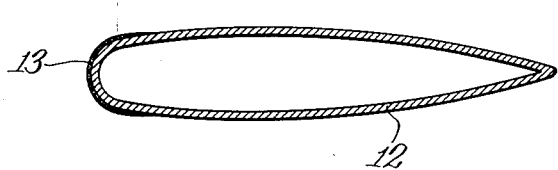

For a more complete understanding of the nature and scope of my invention, reference can be had to the following detailed description taken together with the accompanying drawing in which:

Figure 1 is a top plan view of an aircraft in which the present invention is incorporated; and Figure 2 is a sectional view taken along the line 2—2 of Figure 1.

The aircraft, shown generally at 10 in Figure 1, represents a conventional type of airplane arranged to be propelled by a bladed propeller 11 driven by suitable driving means, such as an internal combustion engine. It will be understood that the present invention can be employed with other types of aircraft such as jet propelled and rocket propelled airplanes, etc. Also, the invention applies under certain conditions to lighter-than-air craft.

As set forth hereinbefore, when the aircraft is of metal construction, particularly having a metal surface, such as aluminum or magnesium or alloys thereof, on the wings 12, it tends to acquire a negative static charge when flying through certain atmospheric conditions, such as snow or ice crystals. The dissipation of this charge may cause interference with radio reception unless the same is accomplished in a manner such, for example, as disclosed in my Patent No. 2,309,584.

With a view to neutralizing the negative static charge the leading surfaces of the aircraft are coated with a material which tends to acquire a positive static charge under the same atmospheric conditions. Since the coating is in close proximity to or in conducting relation with the metal surface of the aircraft, there is a corresponding neutralization of the negative static charge. This neutralization is a continuous process, and thus in a suitably designed construction there is substantially no resultant static charge to be dissipated.

I have found lead can be used to provide the neutralizing coating above referred to. It can be applied by spraying or by dipping or electroplating processes. Also lead foil can be cemented to the surfaces. As soon as the film of oxide on the lead coating is worn off, the coating acquires the positive static charge at a rapid rate.

Tests have shown that the charging rate varies with the angle of incidence (the angle made with the normal to the surface). For lead the charging rate is quite high for angles of incidence between 0 and 60 degrees with the maximum appearing at about 40 degrees. This shows that the leading surfaces of the aircraft and the entire surface of the propeller blades, if used, should be lead coated.

As indicated in Figures 1 and 2 of the drawing, a neutralizing coating 13 is applied to the leading surfaces of the wings 12. A similar coating 14 can also be applied to the forward end of the fuselage 15. Likewise neutralizing coatings 16 and 17 are applied to the leading surfaces of the tail portion 18 and the tail fin 19.

Complete neutralization is not essential. It is desired to prevent the accumulation of static at a rate which leads to a rate or intensity of discharge that interferes with radio reception or instrument operation. The presence of the reverse charge producing coatings 13, 14, 15, 16, 17 and the like itself reduces the accumulation of static on those surfaces which are most directly impinged by the charge developing particles in the atmosphere. A coating which thus does no more than shield said leading surfaces or sufficient of them to be effective is useful by itself, whether or not it produces or tends to produce a charge of a polarity opposing that which the body would otherwise tend to acquire.

The neutralizing coating of lead or the like may also be applied to the propellor and particularly to the leading edges, and such surfaces as are impinged by the air in the operation of the corresponding part.

The concept of impingement of the disturbance creating atmospheric elements upon surfaces of such character location, area and incidence that the negative charge tending to develop upon one is neutralized by the positive charge tending to develop upon the other allows of embodiment in a wide variation of the above-recited relevant factors. The area of the positive charge developing surface by being disposed to receive impingement at a relatively high angle can neutralize a much greater surface of the negative charge developing surface disposed to be impinged at a low angle.

Lead is a material which will give results in conjunction with aluminum or magnesium or an alloy thereof. Other materials will be found by experiment. Obviously different combinations of surfaces may be employed to secure the result of substantial electric neutrality.

Since certain changes can be made in the foregoing construction and process and different embodiments of the invention can be made without departing from the spirit and scope thereof, it is intended that all matter described hereinbefore or shown in the accompanying drawing shall be interpreted as illustrative and not in a limiting sense.

I claim:

1. In combination with a body adapted for free flight through atmospheric air containing crystals of snow or ice, said body comprising a guiding vane for guiding the body in flight by contact with said atmospheric air, said vane comprising a wall formed of two electrically intercommunicating materials one material being metallic aluminum which in flight becomes electropositive and the other material being metallic lead which in flight becomes electronegative in reaction to friction of said body traveling through said atmospheric air containing crystals of snow or ice, said materials exposing separate surface areas to said atmospheric air containing crystals of snow or ice, and said areas being proportioned to generate electric charges of substantially equal magnitude.

2. The combination of claim 1 wherein the body is a metallic body comprising one of said materials and the other material being a coating backed by the material of the metallic body said coating becoming positively charged by friction with said atmospheric air containing crystals of snow or ice.

3. In combination with an airborne metallic body, a device adapted to control the flight of said body through a mass of atmospheric air containing crystals of ice or snow, said device comprising a wall exposing two metallic surface areas to friction with said atmospheric mass, one being formed of metal of the class of aluminum, magnesium and alloys thereof, and taking a negative charge from friction with said atmospheric mass and the other area being formed of lead, and taking a positive charge from friction with said atmospheric mass, said areas being proportioned to generate electric charges of substantially equal magnitude, said materials being in electrical intercommunication.

4. An airplane adapted for free flight through the atmosphere, said plane being constructed to expose two surface areas to friction with a mass of atmospheric air containing snow or ice crystals, one area being formed of metallic aluminum and generating by friction with the snow or ice crystals a negative charge of electricity, the other surface being formed of lead and generating by friction with the snow or ice crystals a positive charge of electricity, the material of said surfaces being in electrical intercommunication, and the areas of said surfaces being proportioned to generate electric charges of substantially equal magnitude.

5. A metallic airplane having aluminum wing and tail vane surfaces and being characterized by acquiring a negative charge of electricity where it flies through a mass of atmospheric air containing snow or ice crystals, said plane having on its leading wing and tail vane surfaces and in conductive relation thereto a coating of lead which acquires a positive charge of electricity when said coating is impinged by said snow or ice crystals.

ROSCOE H. GEORGE.

REFERENCES CITED

The following references are of record in the file of this patent:

UNITED STATES PATENTS

| Number | Name | Date |
|---|---|---|
| 2,151,076 | Betzler | Mar. 21, 1939 |
| 2,297,951 | Frank | Oct. 6, 1942 |
| 2,334,118 | Morse et al. | Nov. 9, 1943 |

FOREIGN PATENTS

| Number | Country | Date |
|---|---|---|
| 458,862 | Great Britain | Dec. 28, 1936 |

OTHER REFERENCES

Text Book, "Physics," p. 338, sixth edition, pub. by P. Blakeston's Son and Co., 1012 Walnut St., Philadelphia, Pa.